(No Model.)
G. WESTINGHOUSE, Jr.
Brake Beam.
No. 243,416. Patented June 28, 1881.
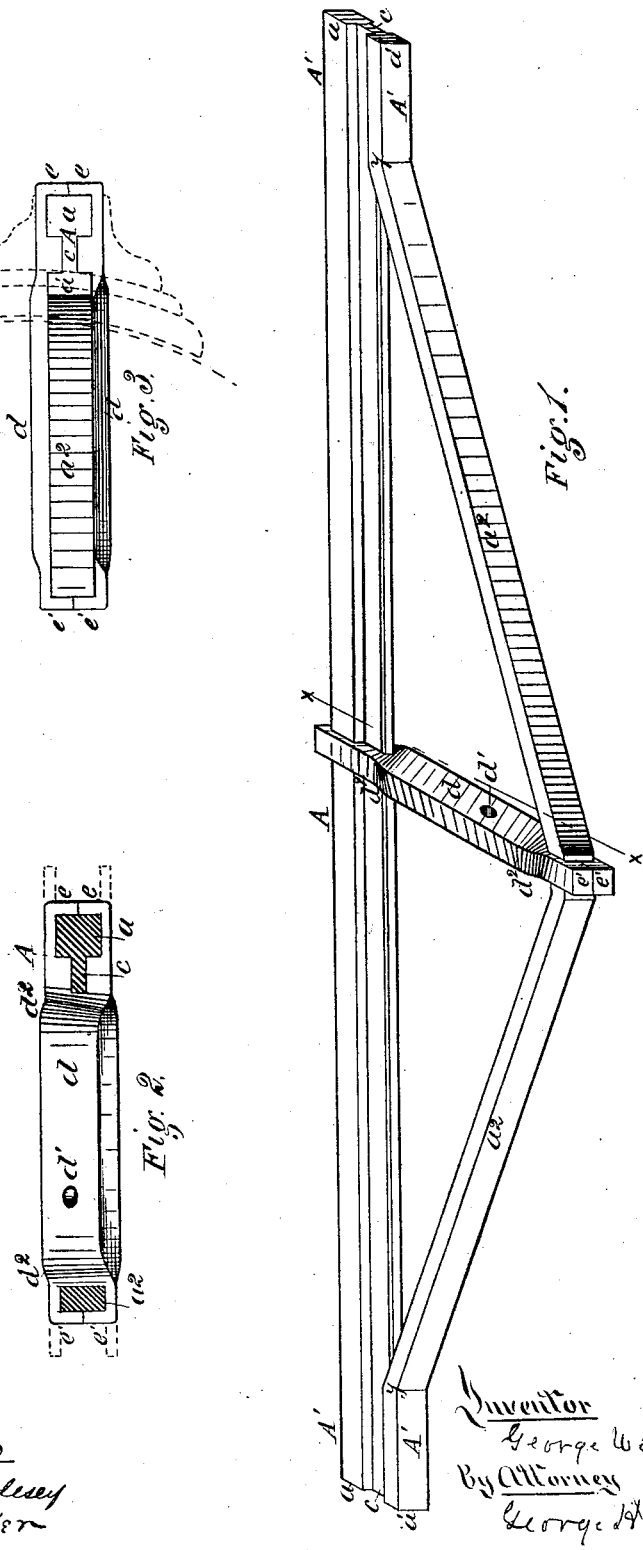

UNITED STATES PATENT OFFICE.

GEORGE WESTINGHOUSE, JR., OF PITTSBURG, PENNSYLVANIA.

BRAKE-BEAM.

SPECIFICATION forming part of Letters Patent No. 243,416, dated June 28, 1881.

Application filed April 25, 1881. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Trussed Brake-Beams; and I do hereby declare the following to be full, clear, concise, and exact description thereof, reference being had to the accompanying drawings, making a part of this specification, in which—like letters indicating like parts—

Figure 1 is a view, in perspective, of my improved brake-beam. Fig. 2 is a sectional view in the plane of the line $x\ x$, Fig. 1; and Fig. 3 is an end view of the same, and showing by dotted lines its arrangement relatively to the brake-shoe and car-wheel at one end.

My present invention relates to certain improvements in trussed brake-beams for railway-car use, and in the manufacture thereof, substantially as hereinafter set forth.

The beam A is rolled from an iron or steel billet, in any of the ways known to the art, to the desired form, and what I deem the preferable form, all things considered, is that shown in the drawings, wherein the entire bar is rolled of what is sometimes called an "H" form, or, in other words, with a comparatively thick heavy head, $a$, along one edge, (say the outer edge,) and another, (preferably a little less heavy,) as at $a'$, along the other edge, the two being connected by a web, $c$; but the sizes and proportions of these parts $a\ a'\ c$ may be varied at pleasure, in accordance with known facts and rules as to strength and strain. Such bars may be rolled and trimmed to proper lengths for railway-brake-beam use, or, in long bars and with trimmed ends, be cut to suitable lengths. Then leaving a portion of each end solid, as at A′, Fig. 1, such portion being of sufficient length for the attachment of any desired form or construction of brake-block or brake-shoe holder, (which attachment may be made by bolting, clamping, or other suitable way,) I split off the head $a'$ by a line or plane of slit or cleavage extending along the plane of junction of such head with the web, between the solid ends A′, as from $y$ to $y$ in Fig. 1. The part $a^2$ so split off is then either drawn by forging, so as to elongate it sufficiently, or else may be cut at any desired point in the line of its length, and a piece, of like cross-section and of suitable length, is inserted between and welded to such cut ends, so as in either case to be long enough to be bent out to form the diagonals, or compression or tension members of a truss, as fully illustrated in Fig. 1. The usual compression-post or tension-rod is inserted, as at $d$, and to this post or rod I attach the brake-lever by a bolt or pin passing through a hole, $d'$, or in other suitable way. This post or rod $d$ may be made in any suitable way or of any suitable material, but preferably I make it from an iron or steel bar of the proper length. In one end of the bar I cut a notch or recess, Fig. 2, large enough and deep enough to take in the central part, $a\ c$, of the main beam, and leave projecting ends $e$, which may then be folded down onto the outer edge of the beam and welded together, if so desired. A like recess is cut in the other end of the bar $d$, of proper size and depth for taking in the central part of the truss rod $a^2$ and leave projecting ends $e'$, which may be folded down and welded in like manner. This gives a structure which is made easily and at small expense, and which is strong, rigid, and durable. The twists shown in the bar $d$ at $d^2$ are to enable the brake-levers to be put in at an angle, or inclined instead of vertical, whereby, without shortening such levers, the beam can be hung higher, so as to keep the lower ends of the brake-shoes higher above the track.

As illustrated in Fig. 3, the truss-beam is so arranged that the diagonals $a^2\ a^2$ shall, under strain in doing the work of braking, operate under tension. This gives a more compact arrangement than if the apex of the truss projected outwardly from the car-track; but the latter arrangement may be employed, if so preferred, in which case the main beam will be under tension and the diagonals under compression.

In so far as relates to a brake-beam of rolled iron or steel having solid ends and a trussed frame formed by splitting it between such solid ends, and elongating a split-off portion of a truss shape, I do not limit myself to any particular form of cross-section of beam, but the one shown I believe to be the best for the purpose.

It is a characteristic feature of a brake-beam thus made that it has solid unwelded ends, and that the area of its cross-section at all points from end to end is substantially the same; hence by splitting and spreading to a truss form I secure from a rolled bar a practically uniform strength from end to end, without increase of material between its ends, and make the whole structure the stronger by virtue of having solid ends, as formed in the parent bar.

I claim as my invention herein—

A trussed metallic brake beam or bar having solid unwelded ends and a practically-uniform area of cross-section from end to end, substantially as set forth.

In testimony whereof I have hereunto set my hand.

GEORGE WESTINGHOUSE, JR.

Witnesses:
R. H. WHITTLESEY,
GEORGE H. CHRISTY.